Jan. 26, 1965 K. F. NÄGELE 3,167,108
DEVICE FOR WINDING HELICAL SPRINGS
Filed April 13, 1962
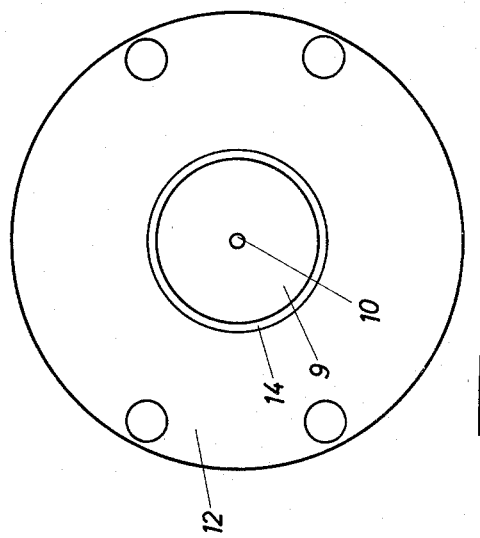
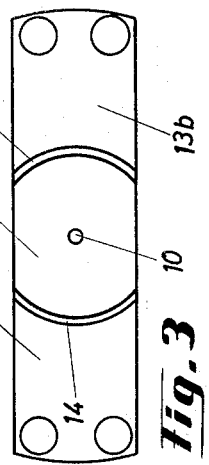
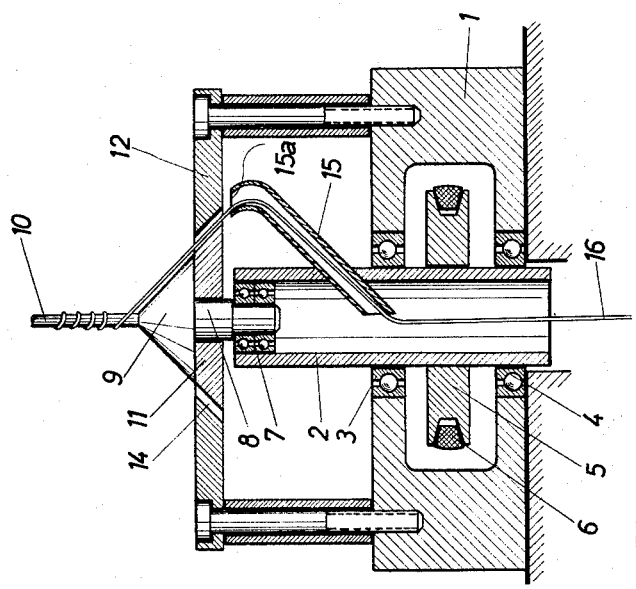
INVENTOR:
KARL FRIEDRICH NÄGELE
E. M. Squire
ATTY.

United States Patent Office 3,167,108
Patented Jan. 26, 1965

3,167,108
DEVICE FOR WINDING HELICAL SPRINGS
Karl Friedrich Nägele, Osumstrasse 1, Stuttgart-Hohenheim, Germany
Filed Apr. 13, 1962, Ser. No. 187,288
7 Claims. (Cl. 153—64)

This invention relates to a device for winding helical springs of wire or thread, particularly however to a device for winding helical springs of wire or thread used for the manufacture of slide fasteners using helical spring type interlocking elements in which the wire or thread is wound on a stationary mandrel by rotating the wire therearound from which the helical coils are removed to be processed further.

It is known in the art to produce helical springs of a suitable material by feeding the wire, which is unwound from a rotatably mounted reel, to a mandrel which is rotated about its axis. If the thus produced helical spring is to be processed further considerable difficulties are encountered, as the produced helical spring continues to rotate even after it leaves the mandrel. Due to this it is only possible to produce helical springs of limited maximum lengths which have to be severed to be processed further.

In order to avoid this drawback and to be able to manufacture helical springs of any desired lengths it is also known in the art to mount the mandrel stationary and to rotate a reel carrying the supply of metal wire or thread of thermoplastic material wound thereon around the mandrel, whereby helical coils are wound on the mandrel by the rotating reel which coils may then be removed from the mandrel to be processed further. It has also been proposed already to use this device for winding helical springs of wires or threads made of thermoplastic material which subsequently are further processed to form the interlocking element of slide fasteners and are connected with carrier tapes. Although this device allows the production of helical springs of any desired lengths it is disadvantageous since the reel carrying the wire supply must rotate around the mandrel and cannot readily be exchanged against a full one when empty.

Therefore the general object of this invention is to provide a device for winding helical springs of any desired length on a stationary mandrel and to achieve at the same time that the reel carrying any desired length of thread or wire may be arranged at any desired location journalled to freely rotate about its axis thereby greatly facilitating the exchange of reels.

A more particular object of this invention is to provide a device for winding helical springs of any desired length mounted on a base or frame in which the mandrel receiving the wire coils is journalled freely rotatably but prevented from rotation by a stationary permanent magnet cooperating with an armature secured to the mandrel while the wire, which is unwound from a reel, is passing through a rotatable hollow shaft axially aligned with the mandrel and through a guide rotating with the hollow shaft to be guided to and passed through an annular slot formed between the armature and the permanent magnet and thence to the mandrel.

Another object of this invention is to provide a device of the above type in which the mandrel receiving the wire coil is rotatably mounted in the end of said hollow shaft.

Another object of this invention is to provide an annularly shaped permanent magnet encompassing a circular disc-like armature in radially spaced relation.

Another object of this invention is to provide a plurality of stationary permanent magnets of flat rod-like shape arranged around the armature of the mandrel in such a way that between each permanent magnet and the armature an arcuate slot is formed the center of these slots coinciding with the axis of the mandrel.

Another object of this invention is to provide a guide for the wire or thread formed by a tube secured to the hollow shaft and extending from the center of the hollow shaft through its wall outwardly terminating directly opposed to the annular slot.

Another object of this invention is to provide an annular slot between the permanent magnet and the armature the walls of which being conical with the apex directed toward the mandrel, and further to provide a conical guide surface formed between the armature and the free end of the mandrel which is forming a continuation of the conical slot wall of the armature.

Another object of this invention is to provide a device of the aforementioned type in which the permanent magnet and the armature are adjustable in axial direction of the mandrel.

Followingly the invention shall be described in detail by way of example in connection with a drawing attached hereto showing the device according to the invention.

In the drawing:

FIG. 1 is an axial sectional view of the wire winding device according to the invention;

FIG. 2 is a front view of the mandrel receiving the wire coils; and

FIG. 3 is a front view of another embodiment of the mandrel receiving the wire coils.

Reference is made to FIG. 1 showing a winding device for helical springs comprising a base plate 1, or a frame respectively, which may be mounted in a machine assembly. The base plate 1 has a through bore in which a sleeve or hollow shaft 2 is rotatably journalled in the bearings 3 and 4. Between the two bearings a V-belt pulley 5, or a gear, or the like is mounted on the hollow shaft 2 which may be driven by a motor via a V-belt, or a gear, or a gear train respectively. Within the one end of the hollow shaft a trunnion 8 is journalled in ball bearings 7, or the like. The trunnion 8 projects from the base of a cone 9, while a mandrel 10 onto which the wire or thread is wound projects from the apex end of the cone 9. An armature 11 is secured to the trunnion 8. The armature 11 may, for example, have a disc-like configuration in which its circumferential surface is forming preferably a continuation of the surface of the cone 9. An annularly shaped permanent magnet 12 fixedly mounted on the base 1 is encompassing the armature disc 11 in radially spaced relation therefrom.

Instead of the annular magnet 12 shown in FIG. 1 also two permanent magnets 13a and 13b may be disposed on opposite sides of the armature the cross sectional shape of which may be adapted to that of the permanent magnets 13a, 13b. By means of this arrangement an annular slot 14 is formed between the armature disc 9 and the permanent magnet 12, or magnets 13a and 13b respectively, forming a continuation of the cone surface of cone 9.

To the wall of the hollow shaft 2 a wire or thread guide 15 formed by a tube is rigidly secured the outer end 15a of which being directly opposed to the annular slot 14 between the armature 11 and the permanent magnet 12, or magnets 13a and 13b respectively, while the inner end of the tube 15 terminates approximately in the center of the hollow shaft 2. The wire, or thread of plastic material respectively, which is unwound from a supply reel (not shown), is passed through the hollow shaft 2 and thence through the guide tube 15 and the annular slot 14 to the coil receiving mandrel.

The supply reel may in this case be disposed rotatably and exchangeably at any suitable location. If the hollow shaft 2 is rotated by the pulley 5 the thread guide 15 is taken along whereby the thread or wire is passing through the annular slot 14 and wound on the mandrel 10 which does not rotate, since the permanent magnet 12, or magnets 13a and 13b are holding the armature 11 and thus the cone 9 and the mandrel 10.

By means of this a winding device for helical springs, preferably made of a thread or wire of plastic material, is provided in a most simple manner, in which each individual coil which is wound on the mandrel 10 is pushed off from the mandrel by the subsequent coil and the thus formed helical spring is processed further to be used as interlocking element of a slide fastener and is connected with a carrier tape.

As may be seen in FIG. 1 it is advantageous to form the circumference of the armature 11 and the opposed surface of the magnet 12, or magnets 13a and 13b respectively, as conical surfaces the apex of which being directed toward the mandrel 10. Thereby the annular slot 14 is also directed towards the center of the mandrel, whereby any obstacle between the end 15a of the rotating guide tube 15 and the circumference of the mandrel 10 is avoided when winding the wire or thread on the mandrel. Furthermore it is possible to shift and secure the armature 11 or the permanent magnet 12, or magnets 13a and 13b respectively, in axial direction of the mandrel, whereby the width of the annular slot 14 may be varied.

What I claim is:

1. Wire coiling apparatus of the class described, comprising: a base structure; first feeding means defining a rectilinearly elongated wire feeding channel; first bearing means supporting said first feeding means for free rotation about the longitudinal axis of said channel; supporting means including second bearing means, said supporting means being mounted for free rotation about an axis aligned with said longitudinal axis; a cylindrical mandrel carried by said supporting means, one end of said mandrel being free for permitting coiled wire to be removed axially from said mandrel, the longitudinal axis of said mandrel being aligned with the longitudinal axis of said channel; second feeding means carried by said first feeding means and communicating with said channel, said second feeding means directing wire from the interior of said channel toward said mandrel to be coiled thereon; means defining an arcuate gap between said supporting means and said base structure concentric with the longitudinal axis of said channel, the wire being coiled passing freely throughout the entire length of said gap during its passage from said second feeding means to said mandrel during rotation of said first feeding means; means for driving said first feeding means to cause said second feeding means to coil wire around said mandrel; and means for causing magnetic flux to traverse said gap for restraining said supporting means and said mandrel against rotation.

2. Wire coiling apparatus according to claim 1, wherein said means for causing said magnetic flux to traverse said gap comprises at least one permanent magnet.

3. Wire coiling apparatus according to claim 1, wherein said arcuate gap extends continuously throughout a complete circle.

4. Wire coiling apparatus according to claim 1, wherein said means defining an arcuate gap defines a plurality of separate arcuate gaps of equal radii of curvature, said means for causing magnetic flux to traverse said gap causing flux to traverse at least one of said separate gaps.

5. Wire coiling apparatus of the class described, comprising a base structure; a plate supported by said base structure, said plate having a frusto-conical aperture formed therein, the axis of said aperture being perpendicular to said plate; a hollow tube member supported by said base structure for free rotation about an axis coaxial with said aperture; a frusto-conical member supported by said tube member for free rotation about the axis of said aperture, said frusto-conical member and said aperture defining a parallel-sided frusto-conical gap therebetween; a substantially conical supporting member carried by said frusto-conical member, the surface of said conical member forming an extension of the convergent surface of said frusto-conical member; a cylindrical mandrel supported by said conical member in axial alignment therewith, one end of said mandrel being connected to said conical member at the apex thereof, the other end of said mandrel being free; a guide member carried by said tube member and receiving wire axially from the interior of said tube member, said guide member feeding said wire through said gap parallel to and spaced from the sides thereof to be wound around said mandrel; drive means for causing rotation of said tube member; and magnetic means causing flux to traverse said gap for restraining said frusto-conical member against rotation with respect to said plate.

6. Wire coiling apparatus according to claim 5, wherein said gap is interrupted to form a plurality of separate gaps, said magnetic means causing flux to traverse at least one of said separate gaps.

7. Wire coiling apparatus according to claim 5, wherein said gap extends continuously throughout a complete circle, said magnetic means having pole portions spaced circumferentially of said circle.

References Cited by the Examiner

UNITED STATES PATENTS

| | | | |
|---|---|---|---|
| 2,164,679 | 7/39 | Braun | 153—67 |
| 3,053,306 | 9/62 | Brock et al. | 153—67 |

FOREIGN PATENTS

| | | |
|---|---|---|
| 1,042,527 | 6/53 | France. |
| 882,270 | 7/53 | Germany. |

CHARLES W. LANHAM, *Primary Examiner.*